(12) United States Patent
Tonius et al.

(10) Patent No.: US 9,939,028 B2
(45) Date of Patent: Apr. 10, 2018

(54) TRANSMISSION DEVICE FOR A MOTOR VEHICLE

(71) Applicant: Daimler AG, Stuttgart (DE)

(72) Inventors: Nils Tonius, Weinstadt (DE); Markus Brandenburg, Esslingen (DE); Tobias Haerter, Stuttgart (DE); Markus Rossmeier, Sersheim (DE)

(73) Assignee: Daimler AG, Stuttgart (DE)

( * ) Notice: Subject to any disclaimer, the term of this patent is extended or adjusted under 35 U.S.C. 154(b) by 92 days.

(21) Appl. No.: 14/900,603

(22) PCT Filed: Jun. 13, 2014

(86) PCT No.: PCT/EP2014/001607
§ 371 (c)(1),
(2) Date: Dec. 21, 2015

(87) PCT Pub. No.: WO2014/202195
PCT Pub. Date: Dec. 24, 2014

(65) Prior Publication Data
US 2016/0138706 A1 May 19, 2016

(30) Foreign Application Priority Data

Jun. 22, 2013 (DE) .................. 10 2013 010 523
Jul. 11, 2013 (DE) .................. 10 2013 011 553
(Continued)

(51) Int. Cl.
*F16H 3/66* (2006.01)
*F16D 23/06* (2006.01)
(Continued)

(52) U.S. Cl.
CPC ............. *F16D 23/06* (2013.01); *F16D 25/14* (2013.01); *F16H 3/66* (2013.01); *F16H 61/0265* (2013.01);
(Continued)

(58) Field of Classification Search
CPC ......... Y10T 477/6933; Y10T 477/6936; F16D 23/06; F16D 25/14; F16D 21/00;
(Continued)

(56) References Cited

U.S. PATENT DOCUMENTS 2,049,127 A  7/1936 Maybach
3,508,450 A * 4/1970 Richards ................ F16H 3/097
                                                    192/106 F
(Continued)

FOREIGN PATENT DOCUMENTS

AT        191204 B     8/1957
CA        493060 A     5/1953
(Continued)

OTHER PUBLICATIONS

English translation of DE102011108024A1, translationportal.epo.org, May 15, 2017.*
(Continued)

*Primary Examiner* — Roger L Pang
(74) *Attorney, Agent, or Firm* — Crowell & Moring LLP

(57) ABSTRACT

A transmission device for a motor vehicle is disclosed. The transmission device includes at least one coupling unit, which for non-rotatable connection of two coupling elements, has a friction-locking unit and a form-locking unit connected in parallel to the friction-locking unit. The device further includes a first hydraulic and/or pneumatic actuator for actuation of the form-locking unit, a second hydraulic and/or pneumatic actuator for actuating the friction-locking unit, and a directional valve for controlling the first actuator provided for actuation of the form-locking unit. The directional valve has a control line connection which in at least one operational state is connected in pressure terms to the second actuator provided for actuation of the friction-locking unit.

9 Claims, 3 Drawing Sheets

(30) Foreign Application Priority Data

| Jul. 11, 2013 | (DE) | ........................ 10 2013 011 555 |
| Jul. 11, 2013 | (DE) | ........................ 10 2013 011 566 |
| Jul. 11, 2013 | (DE) | ........................ 10 2013 011 567 |

(51) Int. Cl.
*F16D 48/02* (2006.01)
*F16H 61/02* (2006.01)
*F16D 21/00* (2006.01)
*F16D 25/10* (2006.01)

(52) U.S. Cl.
CPC .............. *F16D 21/00* (2013.01); *F16D 25/10* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01); *Y10T 477/6933* (2015.01); *Y10T 477/6936* (2015.01)

(58) Field of Classification Search
CPC .... F16D 25/10; F16H 3/66; F16H 2200/2094; F16H 2200/2064; F16H 2200/2012; F16H 2200/0065; F16H 2200/2046
USPC ............................. 192/48.5, 48.601, 48.609
See application file for complete search history.

(56) References Cited

U.S. PATENT DOCUMENTS

| 2011/0284337 | A1* | 11/2011 | Gassmann | ............. B60K 17/35 |
| | | | | 192/48.601 |
| 2013/0196818 | A1* | 8/2013 | Arnold | ................ B60W 10/023 |
| | | | | 477/53 |
| 2014/0298790 | A1* | 10/2014 | Oita | ........................ F16H 3/663 |
| | | | | 60/420 |

FOREIGN PATENT DOCUMENTS

| DE | 639397 C | 12/1936 |
| DE | 680423 C | 8/1939 |
| DE | 700712 C | 12/1940 |
| DE | 30 35 045 A1 | 3/1982 |
| DE | 196 26 194 A1 | 1/1998 |
| DE | 197 00 769 A1 | 5/1998 |
| DE | 197 11 971 A1 | 9/1998 |
| DE | 10 2004 017 123 A1 | 10/2005 |
| DE | 10 2007 036 097 A1 | 2/2009 |
| DE | 10 2008 055 626 A1 | 5/2010 |
| DE | 10 2010 002 747 A1 | 9/2011 |
| DE | 10 2011 108 024 A1 | 3/2012 |
| DE | 10 2011 017 695 A1 | 10/2012 |
| DE | 10 2011 076 368 A1 | 11/2012 |
| DE | 10 2011 084 587 A1 | 4/2013 |
| EP | 0 184 077 B1 | 6/1986 |
| GB | 1202412 A * | 8/1970 |

OTHER PUBLICATIONS

PCT/EP2014/001607, International Search Report (PCT/ISA/220 and PCT/ISA/210) dated Mar. 13, 2015, with partial English translation, enclosing Written Opinion of the International Searching Authority (PCT/ISA/237) (Thirteen (13) pages).
German Search Report issued in counterpart DE 10 2013 011 553.1 dated Jan. 20, 2014, with Statement of Relevancy (Six (6) pages).
German Search Report issued in counterpart DE 10 2013 011 555.8 dated Feb. 10, 2014, with Statement of Relevancy (Six (6) pages).
German Search Report issued in counterpart DE 10 2013 011 566.3 dated Jun. 12, 2014, with Statement of Relevancy (Eight (8) pages).

\* cited by examiner

TRANSMISSION DEVICE FOR A MOTOR VEHICLE

BACKGROUND AND SUMMARY OF THE INVENTION

The invention relates to a transmission device.

A transmission device for a motor vehicle is already known from DE 10 2011 108 024 A1, comprising a coupling unit, which for non-rotatable connection of two coupling elements has a friction-locking unit and a form-locking unit connected in parallel to the friction-locking unit, with a first hydraulic actuator for actuation of the form-locking unit, with a second hydraulic actuator for actuating the friction-locking unit and with a directional valve for controlling the first actuator.

Moreover, it is known from the generic CA 493 060 A that the directional valve has a control line connection which in at least one operational state is connected in pressure terms to the second actuator provided for actuation of the friction-locking unit.

The object of the invention is in particular to improve the control of the first actuator.

The invention relates to a transmission device for a motor vehicle, including at least one coupling unit, which for non-rotatable connection of two coupling elements has a friction-locking unit and a form-locking unit connected in parallel to the friction-locking unit, also including a first hydraulic and/or pneumatic actuator for actuation of the form-locking unit, a second hydraulic actuator for actuating the friction-locking unit and a directional valve for controlling the first actuator provided for actuation of the form-locking unit. Within the context of the invention a form-locking unit connected in parallel to the friction-locking unit is understood to be a form-locking unit connected in parallel to a form-locking unit in the flux of force. The coupling elements can be connected non-rotatably, both by closure of the friction-locking unit and also by closure of the friction-locking unit and also by closure of the friction-locking unit and the form-locking unit, to a coupling unit which, for non-rotatable connection of two coupling elements, has a friction-locking unit and a form-locking unit connected in parallel to the friction-locking unit.

Furthermore it is assumed that the directional valve has a control line connection which in at least one operational state is connected in pressure terms to the second actuator provided for actuation of the friction-locking unit. The first actuator provided for actuation of the form-locking unit can be controlled as a function of the actuation of the friction-locking unit by the connection, in pressure terms, of the control line connection of the directional valve to the second actuator provided for actuation of the friction-locking unit, so that the form-locking unit can be closed only when the friction-locking unit is closed. As a result the form-locking unit can be prevented from being closed in an unsynchronized state, so that the form-locking unit can be closed conveniently and with low wear. The first actuator provided for actuation of the form-locking unit can be controlled as a function of a disc actuation pressure provided for actuation of the parallel connected friction-locking unit, so that a reliable criterion can be provided particularly simply for closure of the form-locking unit. As a result a convenient and low-wear closure of the form-locking unit can take place reliably, so that the control of the first actuator provided for actuation of the form-locking unit can be improved. A "coupling unit" should also be understood in particular to be both a clutch and also a brake. A "clutch" should be understood in particular to be a unit which is provided in order for two rotatably disposed coupling elements to be selectively connected to one another non-rotatably or separated from one another. A "brake" should be understood in particular to be a unit which is provided in order for a rotatable coupling element and a fixed coupling element, which is preferably connected non-rotatably to a fixed component or is formed integrally therewith, to be selectively connected to one another non-rotatably or separated from one another. The fixed component is advantageously configured as a transmission housing for the transmission device. A "friction-locking unit" should be understood in particular to be a unit which produces the non-rotatable connection substantially by a frictional grip produces, such as for example a multiple-disc clutch or a multiple-disc brake. A "form-locking unit" should be understood in particular to be a unit which produces the non-rotatable connection substantially by form locking, such as for example a claw clutch or a claw brake. The friction-locking unit and the form-locking unit are preferably functionally disposed between the two coupling elements. A "control line connection" should be understood in particular to be a hydraulic or pneumatic operating material connection which is provided for switching of the directional valve and/or is connected in pressure terms to a control volume of the directional valve for supply of operating medium pressure to the control volume. Within the context of the invention a control volume should preferably be understood as a volume which is delimited by a valve housing of the directional valve and a control surface of a valve slide, which is movable in the valve housing, of the directional valve. An operating medium pressure prevailing in the control volume preferably acts on the control surface of the valve slide which delimits the control volume, so that the valve slide shifts in the valve housing in the event of corresponding supply of operating medium pressure. A "connection in pressure terms" should be understood in particular to be a hydraulic or pneumatic connection between at least two connection partners by which at least in a hydrostatic operational state an at least substantially equal operating medium pressure prevails on, in and/or between the connection partners. "Provided" should be understood in particular to mean specially constructed, equipped, configured and/or disposed. The control line connection according to the invention, which in at least one operational state is connected in pressure terms to the second actuator provided for actuation of the friction-locking unit, is provided so that the control volume connected in pressure terms to the control line connection can be supplied with the disc actuation pressure. The disc actuation pressure acts on the control surface delimiting the control volume for the disc actuation pressure of the valve slide of the directional valve.

According to the invention it is proposed that the directional valve has a second control line connection which in at least one operational state is connected in pressure terms to the first actuator provided for actuation of the form-locking unit. As a result a claw actuation pressure for actuation of the form-locking unit and the disc actuation pressure provided for actuation of the parallel connected friction-locking unit can be used to control the directional valve, so that the control of the first actuator can be optimized. The control line connections of the directional valve are preferably associated in each case with a control volume, and are provided for the supply of operating medium pressure in each case to a control volume, wherein the control volumes are separated from one another in pressure terms. The second control line connection according to the invention, which in at least one operational state is connected in pressure terms to the first actuator provided for actuation of the form-locking unit, is provided so that the control volume connected in pressure terms to the second control line connection can be supplied with the claw actuation pressure. The claw actuation pressure acts on the control surface of the valve slide of the directional valve, which control surface delimits the control volume which is connected in pressure terms to the second control line connection.

In a further embodiment of the invention it is advantageous if the directional valve has a valve slide with two control surfaces associated in each case with one of the control line connections, wherein the control surfaces are oriented in the same direction. As a result, with the form-locking unit closed, a valve position of the directional valve which is set by the disc actuation pressure provided for actuation of the friction-locking unit can be maintained by the claw actuation pressure provided for actuation of the form-locking unit, and the disc actuation pressure can be lowered, for example for releasing a tooth-on-tooth position in the form-locking unit, without the directional valve leaving the valve position set by the disc actuation pressure. As a result advantageously it is also possible in principle for the claw actuation pressure to be used for maintaining the valve position set by the disc actuation pressure, so that the friction-locking unit can be opened after the closure of the form-locking unit. A "control surface associated with a control line connection" should be understood in particular to be a control surface which delimits a control volume which is connected in pressure terms to the control line connection for the supply of operating medium pressure, so that preferably an operating medium pressure applied to the control line connection prevails in the control volume and thus acts on the control surface. "Control surfaces which are oriented in the same direction" should in particular be understood to mean that surface normals of one control surface and surface normals of the other control surface are aligned in the same direction. Under the action of an operating medium pressure the control surfaces oriented in the same direction are preferably provided for movement of the valve slide for an adjustment of the same valve position of the directional valve. A supply of operating medium pressure to control volumes associated with control surfaces which are oriented in the same direction effects a movement of the valve slide in the same direction. A "surface normal" should in particular be understood to be a direction vector which is disposed orthogonally on a surface and directed away therefrom.

In a further embodiment of the invention the directional valve has at least one third control line connection and the valve slide has a control surface which is associated with the third control line connection and is oriented in the opposite direction to the further control surfaces of the valve slide. Due to the third control line connection which is additionally provided in this embodiment of the invention with the control surface associated with the third control line connection, the valve slide of the directional valve can advantageously be supplied with an additional third control pressure and the valve position can be set as a function of the third control pressure. In particular in a transmission device having a further coupling unit which is likewise controlled by the directional valve, in the event of gear shifts, due to the possible supply of a third control pressure to the valve slide of the directional valve conflicts for the control of the further coupling unit by the directional valve can be avoided, so that particularly convenient gear shifts can be performed. Within the context of the invention the further coupling unit which is likewise controlled by the directional valve is designated as a second further coupling unit. Due to the possible supply of a third control pressure to the valve slide of the directional valve, conflicts for the control of the second further coupling unit in the event of a gear shift from an actual gear, in which the coupling unit is closed, into a target gear, in which the second further coupling unit is closed, can be avoided. Furthermore a spring of the directional valve can be supported by a supply of operating medium pressure to the third control surface via the third control line connection, so that the spring can advantageously be configured for low spring forces. A control surface "which is oriented in the opposite direction to the further control surfaces" should be understood in particular to mean that surface normals of the control surface and surface normals of the further control surfaces are aligned in opposite directions to one another. Under the action of an operating medium pressure the control surfaces oriented in opposite directions are preferably provided for movement of the valve slide for setting of opposing valve positions of the directional valve.

In a further embodiment of the invention the transmission device has a solenoid valve and a third actuator for actuation of a first further coupling unit, wherein in at least one operational state the first further coupling unit is connected in pressure terms to the third control line connection, so that an operating medium pressure provided for actuation of the third coupling unit can be used as third control pressure for an adjustment of the directional valve. Within the context of the invention the fact that a "solenoid valve has an . . . actuator for actuation of a . . . coupling unit" is understood to mean that a solenoid valve controls an actuator and the actuator then actuates the coupling unit by the solenoid valve according to the control guidelines. The provision of the third control line connection, which is connected in pressure terms to the third actuator for actuation of the first further coupling unit, advantageously enables an adjustability of a supply of operating medium pressure to the third control line connection by means of the solenoid valve, which is provided for an operating medium pressure adjustment in the third actuator for actuation of a first further coupling unit of the transmission device. Thus the operating medium pressure set by the solenoid valve can be used advantageously not only for actuation of the first further coupling unit, but additionally also for control of the form-locking unit. According to the invention the disc actuation pressure provided for actuation of the friction-locking unit acts on the valve slide of the directional valve as a control pressure, the claw actuation pressure provided for actuation of the form-locking unit acts as a second control pressure, and the operating medium pressure provided for actuation of the first further coupling unit acts as a third control pressure. In this case the directional valve according to the invention is configured so that on the valve slide of the directional valve the operating medium pressure provided for actuation of the first further coupling unit counteracts the claw actuation pressure provided for actuation of the form-locking unit and the disc actuation pressure provided for actuation of the parallel connected friction-locking unit.

In a further embodiment according to the invention the directional valve has at least one spring of which the spring force is oriented in the same direction as the control surface which is associated with the third control line connection of the valve slide. If in the transmission device according to the invention the solenoid valve and the third actuator are provided for actuation of the first further coupling unit, wherein in at least one operational state the first further coupling unit is connected in pressure terms to the third control line connection, and the operating medium pressure provided for actuation of the first further coupling unit and the spring force counteract the claw actuation pressure provided for actuation of the form-locking unit and the disc actuation pressure provided for actuation of the parallel connected friction-locking unit, then advantageously the extent of transverse influences on the further control system of the transmission device which originate from a control of the directional valve can be kept small, which is explained in greater detail for an exemplary embodiment of the invention.

In a further embodiment of the invention the first further coupling unit is closed in a fourth, fifth, sixth, seventh, eighth and ninth forward gear and the coupling unit is closed in the eighth forward gear, in the ninth forward gear and in a reverse gear. If in the transmission device according to this embodiment of the invention the solenoid valve and the third actuator are provided for actuation of the first further coupling unit, wherein in at least one operational state the first further coupling unit is connected in pressure terms to the third control line connection, and the operating medium pressure provided for actuation of the first further coupling unit and the spring force counteract the claw actuation pressure provided for actuation of the form-locking unit and the disc actuation pressure provided for actuation of the parallel connected friction-locking unit, then advantageously control of the form-locking unit by the directional valve according to the invention in the reverse gear is simple in control engineering terms. In the transmission device according to this embodiment of the invention, in the reverse gear the control volume of the directional valve, which is delimited by the control surface associated with the third control line connection, is without pressure.

In a further embodiment of the invention the transmission device has a working pressure system which, in at least one operational state, is connected in pressure terms to the third control line connection. As a result the directional valve can be switched as a function of the working pressure, so that the first actuator provided for actuation of the form-locking unit can be controlled as a function of the working pressure, the disc actuation pressure and the claw actuation pressure. Thus according to the invention the disc actuation pressure provided for actuation of the friction-locking unit acts as a control pressure, the claw actuation pressure provided for actuation of the form-locking unit acts as a second control pressure, and the operating medium pressure acts as a third control pressure. In this case the working pressure advantageously counteracts the claw actuation pressure provided for actuation of the form-locking unit and the disc actuation pressure provided for actuation of the parallel connected friction-locking unit. Within the context of the invention the working pressure system is understood to be the operating medium pressure system for the transmission device, which system is provided for control of the coupling units of the transmission device. In this case the level of the working pressure of the working pressure system is configured with the pressure which is necessary for keeping the coupling units closed in the event of maximum torque requirements.

Furthermore it is proposed that the directional valve has at least one spring of which the spring force is oriented in the opposite direction to the control surface of the valve slide which is associated with the third control line connection. In particular as a result the spring can support the disc actuation pressure provided for actuation of the friction-locking unit and/or the claw actuation pressure provided for actuation of the form-locking unit for movement of the valve slide against the working pressure, so that it is possible that the spring switches the directional valve into a selected valve position when the disc actuation pressure and/or the claw actuation pressure is equal to the working pressure. The control surface and the spring of which the spring force is opposed, with regard to the switching direction, to the control surface associated with the third control line connection are preferably provided for movement of the valve slide in opposite directions. The spring of which the spring force is opposed, with regard to the switching direction, to the control surface associated with the third control line connection, and the operating medium pressure acting on the control surface, act for movement of the valve slide preferably into opposing valve positions. Thus according to the invention the working pressure counteracts the claw actuation pressure provided for actuation of the form-locking unit, the disc actuation pressure provided for actuation of the parallel connected friction-locking unit, and the spring force.

Furthermore it is proposed that the transmission device has a further solenoid valve and a fourth actuator for actuation a second further coupling unit, wherein the directional valve has a first working line connection to which the first actuator is connected, and a second working line connection to which the fourth actuator is connected. As a result the further solenoid valve can be used both for actuation of the form-locking unit and also for actuation of the second further coupling unit, so that the number of solenoid valves and thus the complexity in the transmission device can be kept low. A "working line connection" should be understood in particular to be a hydraulic or pneumatic connection which is provided for supplying operating medium to at least one component of the transmission device or of the motor vehicle, in particular a coupling unit of the transmission device, preferably in order to actuate it, to cool it and/or to lubricate it.

In this embodiment of the invention an adjusted valve position of the directional valve, in which the further solenoid valve is connected to the first actuator for actuation of the form-locking unit, can be maintained only with the claw actuation pressure provided for actuation of the form-locking unit, so that the disc actuation pressure can be lowered, for example for releasing a tooth-on-tooth position of the form-locking unit, without the directional valve leaving the set valve position. Thus a tooth-on-tooth-position of the form-locking unit can advantageously also be released in this embodiment of the invention.

In a further embodiment of the invention the transmission device has a switch-over valve which is provided in order for the control line connection provided for connection to the second actuator to be connected in pressure terms to the first actuator. The provision on the valve slide of a control surface which is only associated with the second control line connection can advantageously be avoided by the provision of the switch-over valve, so that a constructively simple directional valve which is cost-effective in terms of production technology can be provided without a stepped valve slide.

When only one control line connection is provided for the first actuator and the second actuator it is also basically possible for the claw actuation pressure to be used for maintaining the valve position set by the disc actuation pressure, so that the friction-locking unit can be opened after the closure of the form-locking unit.

Further advantages can be seen from the following description of the drawings. Three exemplary embodiments of the invention are shown in the drawings. The drawings, the description of the drawings and the claims contain numerous features in combination. Expediently, the person skilled in the art will also consider the features singly and combine them to form meaningful further combinations.

DETAILED DESCRIPTION OF THE DRAWINGS

Figures 1, 2:
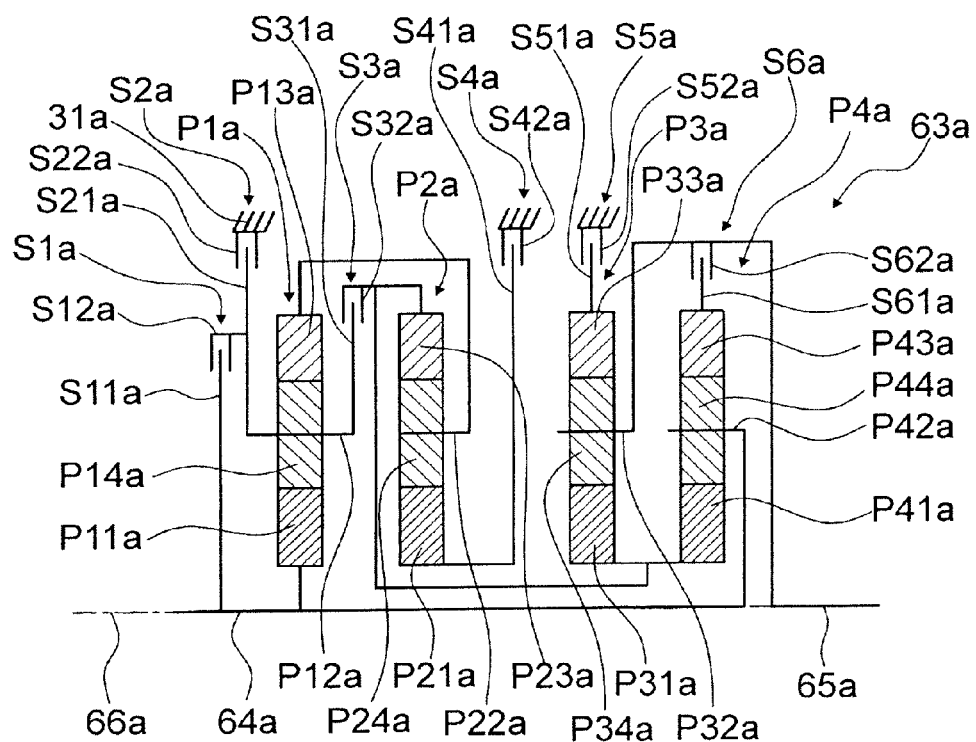
FIG. 1 is a schematic view of a transmission device for a motor vehicle, which device has a combined coupling unit with a friction-locking unit and a form-locking unit.
FIG. 2 is a shift diagram of the transmission device.

FIG. 1 shows in part a transmission device of a motor vehicle, which device forms a part of a motor vehicle drive train. The transmission device is provided for an automatic transmission. The motor vehicle having the transmission device has an internal combustion engine which is not illustrated in greater detail for driving the motor vehicle and drive wheels which are not illustrated in greater detail. The transmission device has a gear wheel set 63a for setting of ten gears V1-V9, R. In this case the gear wheel set 63a is disposed in a flux of force between the internal combustion engine and the drive wheels.

The gear wheel set 63a has nine forward gears V1-V9 and a reverse gear R. The forward gears V1-V9 have consecutive transmission ratios. In this case the first forward gear V1 has the maximum transmission ratio and the last, in this exemplary embodiment the ninth forward gear V9, has the smallest transmission ratio, the transmission ratios decreasing from the low to the high forward gears V1-V9. The reverse gear R has a reverse direction of rotation by comparison with the forward gears V1-V9. The gear wheel set 63a can be connected to a hybrid drive module by means of which a driving torque can be changed. Furthermore a CVT can be produced by means of the hybrid drive module and the gear wheel set 63a, so that the transmission ratio can be continuously adjusted at least in part-zones. The transmission device is configured as a multi-stage transmission device.

The transmission device also has a transmission housing 31a which is disposed stationary. The gear wheel set 63a is disposed inside the transmission housing 31a.

For introduction into the gear wheel set 63a of a driving torque produced by the internal combustion engine the transmission device has a transmission input shaft 64a. The transmission input shaft 64a is disposed in a flux of force proceeding from the internal combustion engine after the drive motor and before the gear wheel set 63a. A module which is not illustrated in greater detail and in particular provides a starting functionality can be connected upstream of the transmission input shaft 64a. A torque converter or a wet starting clutch for example is conceivable as a module connected upstream. Basically, however, the module provided for starting may also be integrated into the gear wheel set 63a.

The transmission device has a transmission output shaft 65a for output of a transmitted driving torque. The transmission output shaft 65a is disposed in the flux of force proceeding from the internal combustion engine after the drive motor and before the gear wheels. A module (not illustrated in greater detail) can be connected downstream of the transmission output shaft 65a, and by means of this module the driving torque output from the gear wheel set 63a can be distributed to the drive gears, such as for example a planetary gear system, which is provided for speed compensation between the drive wheels, or an all-wheel drive unit which distributes the driving torque to two different drive axles. The transmission input shaft 64a and the transmission output shaft 65a can in principle be disposed in any way relative to one another.

The gear wheel set 63a has four planetary gear stages P1a, P2a, P3a, P4a which are functionally connected to one another for shifting the gears V1-V9, R. The first planetary gear stage P1a, the second planetary gear stage P2a, the third planetary gear stage P3a and the fourth planetary gear stage P4a are disposed one behind the other along a main axis of rotation 66a. An axis of rotation of the transmission input shaft 64a coincides with the main axis of rotation 66a. All the planetary gear stages P1a, P2a, P3a, P4a of the gear wheel set 63a have a single planetary gear set. The designations "first", "second", "third" and "fourth" identify an axial succession of the planetary gear stages P1a, P2a, P3a, P4a starting from the internal combustion engine. Accordingly the first planetary gear stage P1a by comparison with the other planetary gear stages P2a, P3a, P4a is disposed at the first axial position, the second planetary gear stage P2a by comparison with the other planetary gear stages P1a, P3a, P4a is disposed at the second axial position, the third planetary gear stage P3a by comparison with the other planetary gear stages P1a, P2a, P4a is disposed at the third axial position and the fourth planetary gear stage P4a by comparison with the other planetary gear stages P1a, P2a, P3a is disposed at the fourth axial position.

The four planetary gear stage P1a, P2a, P3a, P4a are described in greater detail below. The four planetary gear stages P1a, P2a, P3a, P4a each have a sun gear, a planetary gear support and a ring gear. In this case for the sake of simplicity a "first to fourth planetary gear support", a "first to fourth sun gear" and a "first to fourth ring gear" should be understood to mean respectively a planetary gear support or a sun gear or a ring gear associated with the first to fourth planetary gear stage P1a, P2a, P3a, P4a, i.e. for example that the first planetary gear support should be understood to be a planetary gear support of the first planetary gear stage P1a.

The first planetary gear stage P1a is disposed on the input side. The planetary gear stage P1a comprises a first sun gear P11a, a first ring gear P13a and a first planetary gear support P12a. The first planetary gear support P12a carries planetary gears P14a of the first planetary gear stage P1a on a circular path. The planetary gears P14a mesh with the first sun gear P11a and with the first ring gear P13a. The planetary gears P14a are rotatably mounted on the first planetary gear support P12a.

The second planetary gear stage P2a is disposed centrally on the input side. The second planetary gear stage P2a comprises a second sun gear P21a, a second ring gear P23a and a second planetary gear support P22a. The second planetary gear support P22a carries planetary gears P24a of the second planetary gear stage P2a on a circular path. The planetary gears P24a mesh with the second sun gear P21a and with the second ring gear P23a. The planetary gears P24a are rotatably mounted on the second planetary gear support P22a.

The third planetary gear stage P3a is disposed centrally on the output side. The planetary gear stage P3a comprises a third sun gear P31a, a third ring gear P33a and a third planetary gear support P32a. The third planetary gear support P32a carries planetary gears P34a of the third planetary gear stage P3a on a circular path. The planetary gears P34a mesh with the third sun gear P31a and with the third ring gear P33a. The planetary gears P34a are rotatably mounted on the third planetary gear support P32a.

The fourth planetary gear stage P4a is disposed on the output side. The planetary gear stage P4 comprises a fourth sun gear P41a, a fourth ring gear P43a and a fourth planetary gear support P42a. The fourth planetary gear support P42a carries planetary gears P44a of the fourth planetary gear stage P4a on a circular path. The planetary gears P44a mesh with the fourth sun gear P41a and with the fourth ring gear P43a. The planetary gears P44a are rotatably mounted on the fourth planetary gear support P42a.

The first ring gear P13a is permanently connected non-rotatably to the second planetary gear support P22a. The second ring gear P23a is permanently connected non-rotatably to the third sun gear P31a and is permanently connected non-rotatably to the fourth sun gear P41a. The third sun gear P31a and the fourth sun gear P41a are permanently connected to one another non-rotatably. For introduction of the driving torque provided by the internal combustion engine the first planetary gear stage P1a and the fourth planetary gear stage P4a are in each case configured as an input stage. For configuration of the first planetary gear stage P1a as an input stage the first sun gear P11a is permanently connected non-rotatably to the transmission input shaft 64a. For configuration of the fourth planetary gear stage P4a as an input stage the fourth planetary gear support P42a is permanently connected non-rotatably to the transmission input shaft 64a. For output of the driving torque transmitted by the gear wheel set the third planetary gear stage P3a and the fourth planetary gear stage P4a are in each case configured as an output stage. For configuration of the third planetary gear stage P3a as an output stage the third planetary gear support P32a is permanently connected non-rotatably to the transmission output shaft 65a. For configuration of the fourth planetary gear stage P4a as an output stage the fourth ring gear P43a can be connected non-rotatably to the transmission output shaft 65a.

For shifting the gears V1-V9, R the transmission device has six coupling units S1a, S2a, S3a, S4a, S5a, S6a. The coupling units S1a, S2a, S3a, S4a, S5a, S6a are each configured as a gear shift unit for shifting the gears V1-V9, R. The coupling units S1a, S2a, S3a, S4a, S5a, S6a are provided in order either to selectively connect two rotatable transmission elements to one another non-rotatably or to separate them from one another, or selectively to connect a rotatable transmission element non-rotatably to the transmission housing 31a or to separate said transmission element from said transmission housing. In this case a transmission element is a sun gear P11a, P21a, P31a, P41a, a planetary gear support P12a, P22a, P32a, P42a or a ring gear P13a, P23a, P33a, P43a.

The three coupling units S1a, S3a, S6a are in each case configured as a clutch. They each have a first rotatable coupling element S11a, S31a, S61a and a second rotatable coupling element S12a, S32a, S62a. The three coupling units S1a, S3a, S6a are in each case provided in order to connect the two rotatable coupling elements S11a, S12a, S31a, S32a, S61a, S62a thereof to one another non-rotatably.

The three coupling units S2a, S4a, S5a are in each case configured as a brake. They each have a rotatable coupling element S21a, S41a, S51a and a fixed coupling element S22a, S42a, S52a fixed to the housing. The coupling units S2a, S4a, S5a are in each case provided in order to connect the rotatable coupling element S21a, S41a, S51a thereof and the fixed coupling element S22a, S42a, S52a thereof to one another non-rotatably. They are in each case provided in order to connect the rotatable coupling element S21a, S41a, S51a so as to be fixed on the housing and thus to connect said coupling element non-rotatably to the transmission housing 31a.

The first coupling unit S1a has the first rotatable coupling element S11a and the second rotatable coupling element S12a. The first rotatable coupling element S11a of the first coupling unit S1a is permanently connected non-rotatably to the transmission input shaft 64a. The second rotatable coupling element S12a of the first coupling unit S1a is permanently connected non-rotatably to the rotatable coupling element S21a of the second coupling unit S2a. The second rotatable coupling element S12a of the first coupling unit S1a is also permanently connected non-rotatably to the first planetary gear support P12a. The first coupling unit S1a is provided in order to connect the first planetary gear support P12a non-rotatably to the transmission input shaft 64a. The coupling unit S1a only has one friction-locking unit 38a for non-rotatable connection of the rotatable coupling elements S11a, S12a. The coupling unit S1a is configured as a multiple-disc clutch. The friction-locking unit 38a comprises a disc set for non-rotatable connection of the coupling elements S11a, S12a.

The second coupling unit S2a has the rotatable coupling element S21a and the fixed coupling element S22a. The coupling element S21a of the second coupling unit S2a is permanently connected non-rotatably to the first planetary gear support P12a. Furthermore the coupling element S21a of the second coupling unit S2a is permanently connected non-rotatably to the first rotatable coupling element S31a of the third coupling unit S3a. The fixed coupling element S22a of the second coupling unit S2a is permanently connected non-rotatably to the transmission housing 31a. The fixed coupling element S22a of the second coupling unit S2a is integral with the transmission housing 31a. The coupling unit S2a is provided in order to connect the rotatable coupling element S21a thereof and the fixed coupling element S22a thereof to one another non-rotatably. The second coupling unit S2a is provided in order to connect the first planetary gear support P12a fixedly to the housing.

The third coupling unit S3a has the first rotatable coupling element S31a and the second rotatable coupling element S32a. The first rotatable coupling element S31a of the third coupling unit S3a is also permanently connected non-rotatably to the first planetary gear support P12a. The second rotatable coupling element S32a of the third coupling unit S3a is also permanently connected non-rotatably to the second ring gear P23a. The second rotatable coupling element S32a of the third coupling unit S3a is also permanently connected non-rotatably to the third ring gear P31a and permanently connected non-rotatably to the fourth sun gear P41a. The third coupling unit S3a is provided in order to connect the first planetary gear support P12a, the second ring gear P23a, the third sun gear P31a and the fourth sun gear P41a to one another non-rotatably. The coupling unit S3a is configured as a multiple-disc clutch. It only has one friction-locking unit which comprises a disc set for non-rotatable connection of the coupling elements S31a, S32a.

The fourth coupling unit S4a has the rotatable coupling element S41a and the fixed coupling element S42a. The rotatable coupling element S41a of the fourth coupling unit S4a is permanently connected non-rotatably to the second sun gear P21a. The fixed coupling element S42a of the fourth coupling unit S4a is permanently connected non-rotatably to the transmission housing 31a. The fourth coupling unit S4a is provided in order to connect the second sun gear P21a fixedly to the housing. The coupling unit S4a is configured as a multiple-disc brake. It only has one friction-locking unit which comprises a disc set for non-rotatable connection of the coupling elements S41a, S42a.

The fifth coupling unit S5a has the rotatable coupling element S51a and the fixed coupling element S52a. The rotatable coupling element S51a of the fifth coupling unit S5a is permanently connected non-rotatably to the third ring gear P33a. The fixed coupling element S52a of the fifth coupling unit S5a is permanently connected non-rotatably to the transmission housing 31a. The fifth coupling unit S5a is provided in order to connect the third ring gear P33a fixedly to the housing. The coupling unit S5a is configured as a multiple-disc brake. It only has one friction-locking unit which comprises a disc set for non-rotatable connection of the coupling elements S51a, S52a.

The sixth coupling unit S6a has the first rotatable coupling element S61a and the second rotatable coupling element S62a. The first rotatable coupling element S61a of the sixth coupling unit S6a is permanently connected non-rotatably to the fourth ring gear P43a. The second rotatable coupling element S62a of the sixth coupling unit S6a is permanently connected non-rotatably to the third planetary gear support P32a. The second rotatable coupling element S62a of the sixth coupling unit S6a is also permanently connected non-rotatably to the transmission output shaft 65a. The sixth coupling unit S6a is provided in order to connect the fourth ring gear P43a, the third planetary gear support P32a and the transmission output shaft 65a non-rotatably to one another. The coupling unit S6a only has one friction-locking unit 37a for non-rotatable connection of the rotatable coupling elements S61a, S62a. The coupling unit S6a is configured as a multiple-disc clutch. The friction-locking unit 37a comprises a disc set for non-rotatable connection of the coupling elements S61a, S62a.

Figure 3:
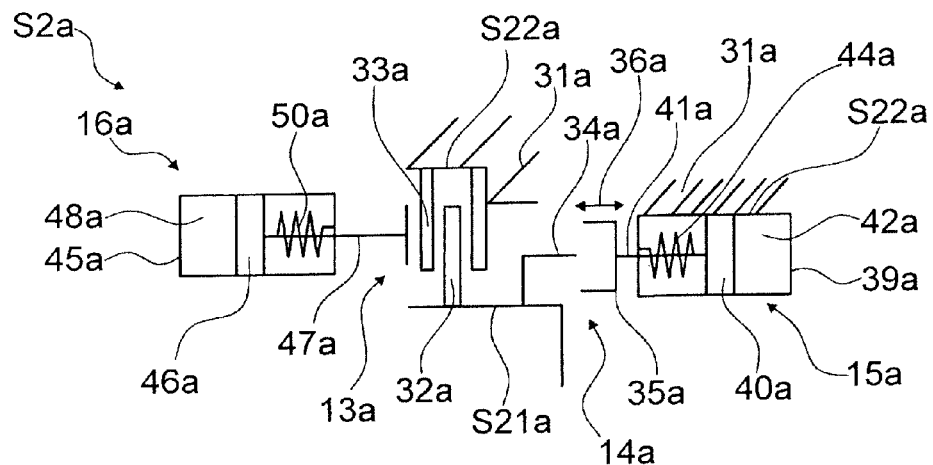
FIG. 3 illustrates the combined coupling unit including a first actuator for actuation of the form-locking unit and a second actuator for actuation of the friction-locking unit.

The second coupling unit S2a is in combined form (cf. FIG. 3). The second coupling unit S2a has a friction-locking unit 13a and a form-locking unit 14a connected in the flux of force in parallel with the friction-locking unit 13a. The friction-locking unit 13a and the parallel connected form-locking unit 14a are in each case provided in order to connect the rotatable coupling element S21a of the second coupling unit S2a so as to be fixed on the housing and thus to connect said coupling element non-rotatably to the transmission housing 31a. The second coupling unit S2a is associated with the first planetary gear stage P1a. The friction-locking unit 13a and the form-locking unit 14a of the second coupling unit S2a are in each case functionally disposed between the rotatable coupling element S21a and the transmission housing 31a.

The friction-locking unit 13a of the combined coupling unit S2a is configured as a multiple-disc brake. It is provided in order to connect the coupling elements S21a, S22a frictionally to one another. The friction-locking unit 13a comprises a disc set for non-rotatable connection of the coupling elements S21a, S22a. The friction-locking unit 13a comprises first friction-locking elements 32a and second friction-locking elements 33a. The first friction-locking elements 32a are permanently connected non-rotatably to the rotatable coupling element S21a of the combined coupling unit S2a. The first friction-locking elements 32a are configured as inner discs. The second friction-locking elements 33a are permanently connected non-rotatably to the fixed coupling element S22a. Thus they are permanently connected non-rotatably to the transmission housing 31a. The second friction-locking elements 33a are disposed so as to be axially movable relative to the fixed coupling element S22a. The second friction-locking elements 33a are configured as outer discs. Furthermore the friction-locking unit 13a of the combined coupling unit S2a has an outer disc support which is permanently connected non-rotatably to the transmission housing 31a, and an inner disc support which is permanently connected non-rotatably to the rotatable coupling element S21a.

The friction-locking unit 14a of the combined coupling unit S2a is configured as a claw brake. It is provided in order to connect the coupling elements S21a, S22a to one another by form-locking. The form-locking unit 14a comprises a first form-locking element 34a and a second form-locking element 35a which can be connected to one another by form-locking. The first form-locking element 34a is permanently connected non-rotatably to the rotatable coupling element S21a of the second coupling unit S2a. The first form-locking element 34a is permanently connected non-rotatably to the inner disc support of the combined coupling unit S2a. The first friction-locking element 32a of the friction-locking unit 13a and the first form-locking element 34a of the form-locking unit 14a are permanently connected non-rotatably to one another. The second friction-locking element 35a is permanently connected non-rotatably to the fixed coupling element S22a. Thus it is permanently connected non-rotatably to the transmission housing 31a. The form-locking elements 34a, 35a are disposed so as to be movable relative to one another along an axial direction of actuation 36a. The second form-locking element 35a is disposed so as to be axially movable along the direction of actuation 36a relative to the first form-locking element 34a and relative to the transmission housing 31a. The second friction-locking element 35a is permanently connected non-rotatably, but axially movably, to the fixed coupling element S22a and thus to the transmission housing 31a. The direction of actuation 36a is oriented parallel to the main axis of rotation 66a. The first form-locking element 34a and the second form-locking element 35a each have a claw toothing for form-locking connection, said claw toothings being configured to correspond to one another. The claw toothings can be disposed radially or axially.

The friction-locking unit 13a and the form-locking unit 14a of the combined coupling unit S2a each have a design torque. The design torque of the friction-locking unit 13a and the design torque of the form-locking element 14a are different. The design torque of the friction-locking unit 13a is lower than the total design torque of the combined coupling unit S2a. The design torque of the friction-locking unit 14a corresponds to the total design torque of the combined coupling unit S2a. Thus the design torque of the friction-locking unit 13a is lower than the design torque of the form-locking element 14a. By comparison with the friction-locking unit 13a the form-locking unit 14a is designed for the transmission of higher torques. The friction-locking unit 13a of the combined coupling unit S2a has the lowest number of discs by comparison with the friction-locking units 37a, 38a of the other coupling units S6a, S1a. The form-locking unit 14a of the combined coupling unit S2a serves as a torque support for the friction-locking unit 13a of the combined coupling unit S2a.

FIG. 2 shows a shift diagram of the transmission device. In the shift diagram a circle filled with black represents a closed coupling unit S1a, S2a, S3a, S4a, S5, S6a and the absence of a circle filled with black represents an opened coupling unit S1a, S2a, S3a, S4a, S5, S6a in the corresponding gear V1-V9, R. The formation of the forward gears V1-V9 and of the reverse gear R by closure of the coupling units S1a-S6a is illustrated in the shift diagram in FIG. 2. To a person skilled in the art the shift diagram in FIG. 2 in conjunction with the transmission diagram in FIG. 1 reveals a power flow.

The coupling unit S1a is closed in the second forward gear V2, in the third forward gear V3, in the fifth forward gear V5 and in the sixth forward gear V6. The coupling unit S2a is closed in the eighth forward gear V8, in the ninth forward gear V9 and in the reverse gear R. The coupling unit S3a is closed in the first forward gear V1, in the second forward gear V2, in the sixth forward gear V6, in the seventh forward gear V7 and in the eighth forward gear V8. The coupling unit S4a is closed in the first forward gear V1, in the third forward gear V3, in the fourth forward gear V4, in the fifth forward gear V5, in the seventh forward gear V7, in the ninth forward gear V9 and in the reverse gear R. The coupling unit S5a is closed in the first forward gear V1, in the second forward gear V2, in the third forward gear V3, in the fourth forward gear V4 and in the reverse gear R. The coupling unit S6a is closed in the fourth forward gear V4, in the fifth forward gear V5, in the sixth forward gear V6, in the seventh forward gear V7, in the eighth forward gear V8 and in the ninth forward gear V9.

For actuation of the friction-locking unit 13a of the combined coupling unit S2a and the form-locking unit 14a of the combined coupling unit S2a the transmission device has two hydraulic actuators 15a, 16a which are independent of one another. The friction-locking unit 13a and the form-locking unit 14a are actuated one after the other, wherein the friction-locking unit 13a grips before the form-locking unit 14a. The form-locking unit 14a is always closed when the friction-locking unit 13a is closed.

The friction-locking unit 15a actuates the form-locking unit 14a of the combined coupling unit S2a in a pressure-controlled manner. The first actuator 15a is disposed inside the transmission housing 31a. The first actuator 15a is configured as a cylinder-piston unit. It has an actuating cylinder 39a, a piston element 40a and an actuating element 41a. The piston element 40a is disposed so as to be axially movable in the actuating cylinder 39a. The piston element 40a is firmly connected to the actuating element 41a. They are designed in one piece with one another. The piston element 40a and the actuating element 41a are fixedly and axially movably connected to the friction-locking element 35a, but are non-rotatably connected to the fixed coupling element S22a and thus to the transmission housing 31a. The actuating cylinder 39a is fixedly connected to the transmission housing 31a. For form-locking connection of the coupling elements S21a, S22a of the combined coupling unit S2a, the actuating element 41a of the first actuator 15a and, as a result, the second form-locking element 35a moves axially in the direction of the first form-locking element 34a, until the mutually corresponding claw toothings of the form-locking unit 14a interengage by form-locking and the coupling elements S21a, S22a are connected to one another by form-locking.

The first actuator 15a also has a pressure chamber 42a. The pressure chamber 42a is provided for closure of the form-locking unit 14a. The first actuator 15a also has a further chamber in which a spring 44a is disposed. The piston element 40a separates the pressure chamber 42a and the further chamber from one another in terms of flow. The spring 44a is functionally disposed between the actuating cylinder 39a and the piston element 40a. A spring force of the spring 44a counteracts the force which can be produced by a hydraulic operating medium pressure in the pressure chamber 42a. The hydraulic operating medium pressure acting in the pressure chamber 42a is configured as a claw actuation pressure which is provided for closing the form-locking unit 14a. The spring 44a is configured as a spiral spring. A means for control of the actuator 15a is provided for closure of the form-locking unit 14a of the combined coupling unit S2a in the forward gears V8, V9 and in the reverse gear R.

The second actuator 16a actuates the friction-locking unit 13a of the combined coupling unit S2 in a pressure-controlled manner. The second actuator 16a is disposed inside the transmission housing 31a. The second actuator 16a is configured similarly to the first actuator 15a, and for this reason the second actuator 16a is only explained briefly. The second actuator 16a has an actuating cylinder 45a, a piston element 46a and an actuating element 47a. For frictional connection of the coupling elements S21a, S22a of the combined coupling unit S2a, the actuating element 47a presses axially against the disc set of the friction-locking unit 13a, so that the discs of the disc set move axially relative to one another until they bear against one another and the coupling elements S21a, S22a are frictionally connected to one another. For closure of the friction-locking unit 13a the second actuator 16a has a pressure chamber 48a. In this case the second actuator 16a has a spring 50a. A hydraulic operating medium pressure acting in the pressure chamber 48a is configured as a claw actuation pressure which is provided for closure of the form-locking unit 13a. The pressure chamber 42a of the first actuator 15a and the pressure chamber 48a of the second actuator 16a are independent of one another with respect to a supply of actuating medium. The pressure chamber 42a of the first actuator 15a and the pressure chamber 48a of the second actuator 16a are separated from one another in pressure terms. A means for control of the actuator 16a is provided for closure of the friction-locking unit 13a of the combined coupling unit S2a in the forward gears V8, V9 and in the reverse gear R.

Figure 4:
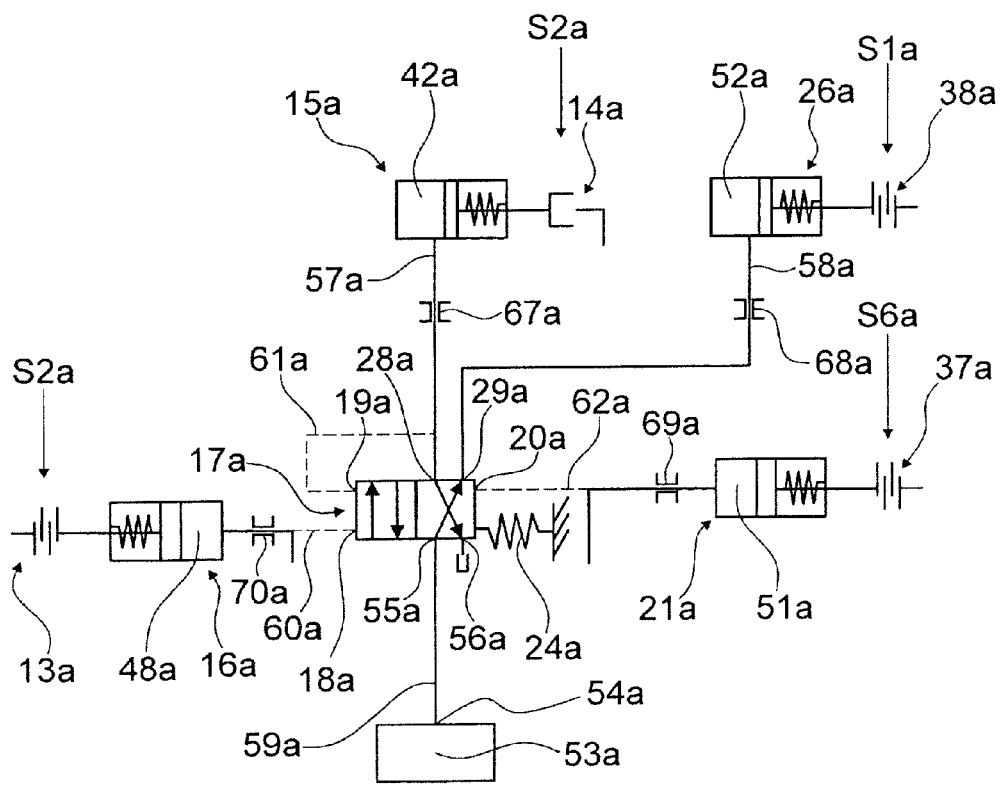
FIG. 4 is a schematic representation of an actuation of the actuators.

For actuation of the coupling unit S6a the transmission device has a third hydraulic actuator 21a (cf. FIG. 4). The third actuator 21a is disposed inside the transmission housing 31a. The third actuator 21a is configured similarly to the first actuator 15a, and for this reason the third actuator 21a is only explained briefly. The third actuator 21a has an actuating cylinder, a piston element and an actuating element. For closure of the coupling unit S6a the third actuator 21a has a pressure chamber 51a. A hydraulic operating medium pressure acting in the pressure chamber 51a is configured as a claw actuation pressure which is provided for closure of the friction-locking unit 37a. A means for control of the actuator 21a is provided for closure of the coupling unit S6a in the forward gears V4, V5, V6, V7, V8, V9.

For actuation of the coupling unit S1a the transmission device has a fourth hydraulic actuator 26a. The fourth actuator 26a is disposed inside the transmission housing 31a. The fourth actuator 26a is configured similarly to the first actuator 15a, and for this reason the fourth actuator 26a is only explained briefly. The fourth actuator 26a has an actuating cylinder, a piston element and an actuating element. For closure of the coupling unit S1a the fourth actuator 26a has a pressure chamber 52a. A hydraulic operating medium pressure acting in the pressure chamber 52a is configured as a disc actuation pressure which is provided for closure of the friction-locking unit 38a. A means for control of the actuator 26a is provided for closure of the coupling unit S1a in the forward gears V2, V3, V5, V6. In principle the actuators 15a, 16a, 21a, 26a can also be pneumatic.

For adjustment of the operating medium pressure in the pressure chamber 42a of the first actuator 15a the transmission device has a first solenoid valve 53a. For supplying operating medium to the pressure chamber 42a of the first actuator 15a the first solenoid valve 53a is provided in order to build up the operating medium pressure in the pressure chamber 42a. The first solenoid valve 53a is provided for adjustment of the claw actuation pressure for closure of the form-locking unit 14a. The first solenoid valve 53a has a hydraulic operating medium output 54a which can be connected in pressure terms to the pressure chamber 42a of the first actuator 15a. The first solenoid valve 53a is configured as a regulating solenoid valve.

For adjustment of the operating medium pressure in the pressure chamber 48a of the second actuator 16a the transmission device has a second solenoid valve (not shown). For supplying operating medium to the pressure chamber 48a of the second actuator 16a the second solenoid valve is provided in order to build up the operating medium pressure in the pressure chamber 48a. The second solenoid valve 53a is provided for adjustment of the disc actuation pressure for closure of the form-locking unit 13a. The second solenoid valve is connected in pressure terms to the pressure chamber 48a of the second actuator 16a. The second solenoid valve forms an operating medium pressure source for the second actuator 16a. The second solenoid valve is configured as a regulating solenoid valve.

For adjustment of the operating medium pressure in the pressure chamber 51a of the third actuator 21a the transmission device has a third solenoid valve (not shown). For supplying operating medium to the pressure chamber 51a of the third actuator 21a the third solenoid valve is provided in order to build up the operating medium pressure in the pressure chamber 51a of the third actuator 21a. The third solenoid valve 53a is provided for adjustment of the disc actuation pressure for closure of the friction-locking unit 37a. The third solenoid valve is connected in pressure terms to the pressure chamber 51a of the third actuator 21a. The third solenoid valve forms an operating medium pressure source for the third actuator 21a. The third solenoid valve is configured as a regulating solenoid valve.

The first solenoid valve 53a, which is also used for adjustment of the operating medium pressure in the pressure chamber 42a of the first actuator 15a, is used for adjustment of the operating medium in the pressure chamber 52a of the fourth actuator 53a. For supplying operating medium to the pressure chamber 52a of the fourth actuator 26a the first solenoid valve 53a is provided in order to build up the operating medium pressure in the pressure chamber 26a of the fourth actuator 26a. The first solenoid valve 53a is provided for adjustment of the disc actuation pressure for closure of the friction-locking unit 38a of the third coupling unit S1a. Thus the first solenoid valve 53a is provided for adjustment of the claw actuation pressure in the pressure chamber 42a of the first actuator 15a and for adjustment of the disc actuation pressure in the pressure chamber 42a of the fourth actuator 26a. With regard to the adjustment of the operating medium pressure the first solenoid valve 53a has a dual use by which the first actuator 15a and the fourth actuator 26a can be supplied with the operating medium by the first solenoid valve 53a. The first solenoid valve 53a forms an operating medium pressure source for the first actuator 15a and for the fourth actuator 26a. The form-locking unit 14a is actuated by the dual use without an additional solenoid valve. For actuation of the form-locking unit 14a and the three friction-locking units 13a, 37a, 38a the transmission device only has three solenoid valves 53a. Thus the solenoid valve 53a sets an operating medium pressure in the forward gears V2, V3, V5, V6, V8, V9 and in the reverse gear R, wherein the operating medium pressure in the forward gears V2, V3, V5, V6 is configured as the disc actuation pressure for closure of the coupling unit S1a and in the forward gears V8, V9 as well as in the reverse gear R as the claw actuation pressure for closure of the coupling unit S2a.

For control of the dual use of the first solenoid valve 53a the transmission device has a directional valve 17a which is provided for control of the first actuator 15a and for control of the fourth actuator 26a. The directional valve 17a controls the supply of operating medium to the pressure chamber 42a of the first actuator 15a and the supply of operating medium to the pressure chamber 52a of the fourth actuator 26a. It is provided in order to selectively connect the pressure chamber 42a of the first actuator 15a and the pressure chamber 52a of the fourth actuator 26a in pressure terms to the first solenoid valve 53a. In the forward gears V2, V3, V5, V6 the directional valve 17a connects the actuator 26a provided for the coupling unit S1a to the solenoid valve 53a, and in the forward gears V8, V9 as well as in the reverse gear R said directional valve connects the actuator 15a provided for the coupling unit S2a to the solenoid valve 53a.

The directional valve 17a has a first hydraulic working line connection 28a, a second hydraulic working line connection 29a, a hydraulic supply line connection 55a and a hydraulic discharge connection 56a. The first working line connection 28a is connected in pressure terms to the first actuator 15a provided for actuation of the form-locking unit 14a. The first working line connection 28a is connected in pressure terms to a hydraulic working line 57a of the transmission device, said working line opening into the pressure chamber 42a of the first actuator 15a. The working line 57a connects the pressure chamber 42a of the first actuator 15a and the first working line connection 28a of the directional valve 17a to one another in pressure terms. The fourth working line connection 29a is connected in pressure terms to the fourth actuator 26a provided for actuation of the third coupling unit S1a. The second working line connection 29a is connected in pressure terms to a hydraulic working line 58a of the transmission device, said working line opening into the pressure chamber 52a of the fourth actuator 26a. The working line 58a connects the pressure chamber 52a of the fourth actuator 26a and the second working line connection 29a of the directional valve 17a to one another in pressure terms. The working lines 57a, 58a are separated from one another in pressure terms.

The supply line connection 55a is connected in pressure terms to the first solenoid valve 53a. The supply line connection 55a is connected in pressure terms to a hydraulic supply line 59a of the transmission device, said supply line being connected in pressure terms to the first solenoid valve 53a. The working line 59a connects the operating medium output 54a of the first solenoid valve 53a and the supply line connection 55a of the directional valve 17a to one another in pressure terms. The operating medium pressure set by the first solenoid valve 53a prevails at least predominantly in the supply line 59a and thus at the supply line connection 55a. The first solenoid valve 53a can be selectively connected to and separated from the first actuator 15a and the fourth actuator 26a by means of the directional valve 17a. The discharge connection 56a opens into a pressureless operating medium reservoir.

For hydraulic control the directional valve 17a has three hydraulic control line connections 18a, 19a, 20a. The first control line connection 18a is provided for hydraulic actuation of the directional valve 17a into a valve position in which the first actuator 15a is connected in pressure terms to the first solenoid valve 53a. The first control line connection 18a of the directional valve 17a is permanently connected in pressure terms to the second actuator 16a provided for actuation of the friction-locking unit 13a. The first control line connection 18a of the directional valve 17a is permanently connected in pressure terms to the pressure chamber 48a of the second actuator 16a provided for actuation of the friction-locking unit 13a. A control pressure tapping point for the control line connection 18a is located on the side of the filling orifice 70a facing the directional valve 17a. The disc actuation pressure which is provided for closure of the friction-locking unit 13a is applied to the first control line connection 18a of the directional valve 17a in the forward gears V8, V9 as well as in the reverse gear R. In the forward gears V1, V2, V3, V4, V5, V6, V7 the first control line connection 18a of the directional valve 17a is at least substantially pressureless.

The second control line connection 19a is provided for hydraulic actuation of the directional valve 17a into the valve position in which the first actuator 15a is connected in pressure terms to the first solenoid valve 53a. The second control line connection 19a of the directional valve 17a is permanently connected in pressure terms to the first actuator 15a provided for actuation of the form-locking unit 14a. The second control line connection 19a of the directional valve 17a is permanently connected in pressure terms to the pressure chamber 42a of the first actuator 15a provided for actuation of the form-locking unit 14a. The second control line connection 19a is provided for maintenance of the valve position in which the first actuator 15a is connected in pressure terms to the first solenoid valve 53a. In a state in which the first actuator 15a is connected to the first solenoid valve 53a, the operating medium pressure set by the first solenoid valve 53a is applied at least substantially to the second control line connection 19a of the directional valve 17a. Advantageously through the filling orifice 67a an operating medium pressure on the control line connection 19a drops in a release operation of a tooth-on-tooth position of the form-locking unit 14a at the moment at which the operating medium pressure in the pressure chamber 42a of the first actuator 15a drops, wherein a drop in the operating medium in the pressure chamber 42a, due to engagement of the form-locking element 34a and 35a of the form-locking unit 14a and a resulting sliding of the actuating element 40a of the actuator 15a, is not so substantial that the directional valve 17a switches over to a connection of the solenoid valve 53a to the coupling unit S1a. The claw actuation pressure which is provided for closure of the form-locking unit 14a is applied to the second control line connection 19a of the directional valve 17a in the forward gears V8, V9 as well as in the reverse gear R. The first control line connection 18a and the second control line connection 19a of the directional valve 17a are separated from one another in pressure terms. In the forward gears V1, V2, V3, V4, V5, V6, V7 the second control line connection 19a of the directional valve 17a is at least substantially pressureless.

The first control line connection 20a is provided for hydraulic actuation of the directional valve 17a into a valve position in which the first actuator 15a is separated in pressure terms from the first solenoid valve 53a. The third control line connection 20a of the directional valve 17a is permanently connected in pressure terms to the third actuator 21a provided for actuation of the coupling unit S6a. The third control line connection 20a of the directional valve 17a is permanently connected in pressure terms to the actuator 21a which is provided for actuation of the coupling unit S6a provided for the forward gears V4, V5, V6, V7, V8, V9. The third control line connection 20a of the directional valve 17a is permanently connected in pressure terms to the pressure chamber 51a of the third actuator 21a provided for actuation of the friction-locking unit 37a. The operating medium pressure prevailing in the pressure chamber 51a of the third actuator 21a is applied at least substantially to the third control line connection 20a of the directional valve 17a. The disc actuation pressure which is provided for closure of the friction-locking unit 37a is applied to the third control line connection 20a of the directional valve 17a in the forward gears V4, V5, V6, V7, V8, V9. The first control line connection 18a, the second control line connection 19a and the third control line connection 20a of the directional valve 17a are in each case separated from one another in pressure terms. The third control line connection 20a of the directional valve 17a is at least substantially pressureless in the forward gears V1, V2, V3 as well as in the reverse gear R.

For hydraulic operation the directional valve 17a has a first control volume, a second control volume and a third control volume. The first control line connection 18a is associated with the first control volume, the second control line connection 19a is associated with the second control volume, and the third control line connection 20a is associated with the third control volume. The first control volume can be supplied with the operating medium by the first control line connection 18a. The operating medium pressure prevailing in the pressure chamber 48a of the second actuator 16a prevails at least predominantly in the first control volume. The disc actuation pressure which is provided for closure of the friction-locking unit 13a prevails at least predominantly in the first control volume in the forward gears V8, V9 as well as in the reverse gear R. The second control volume can be supplied with the operating medium by the second control line connection 19a. The operating medium pressure prevailing in the pressure chamber 42a of the first actuator 15a prevails at least predominantly in the second control volume. In the forward gears V8, V9 as well as in the reverse gear R the claw actuation pressure which is provided for closure of the form-locking unit 14a prevails at least predominantly in the second control volume. The third control volume can be supplied with the operating medium by the third control line connection 20a. The operating medium pressure prevailing in the pressure chamber 51a of the third actuator 16a prevails at least predominantly in the third control volume. The disc actuation pressure which is provided for closure of the friction-locking unit 37a prevails at least predominantly in the third control volume in the forward gears V4, V5, V6, V7, V8, V9. The control volumes of the directional valve 17a are in each case separated from one another in pressure terms.

For connection of the control line connections 18a, 19a, 20a the transmission device has three control lines 60a, 61a, 62a. The first control line 60a connects the first control line connection 18a and the second actuator 16a to one another in pressure terms. The first control line 60a supplied the first control volume of the directional valve 17a comprising the operating medium out of the pressure chamber 48a of the second actuator 16a. The second control line 61a connects the first second line connection 19a and the first actuator 15a to one another in pressure terms. The second control line 61a supplies the second control volume of the directional valve 17a to the operating medium provided by the first solenoid valve 53a. The second control line 61a connects the second control volume of the directional valve 17a in pressure terms to the working line which connects the first working line connection 28a to the first actuator 15a. The third control line 62a connects the third control line connection 20a and the third actuator 21a to one another in pressure terms. The third control line 62a supplies the third control volume of the directional valve 17a with the operating medium from the pressure chamber 51a of the third actuator 21a.

The first control line connection 18a and the second control line connection 19a are provided for actuation of the directional valve 17a in the same direction. They are provided for setting the same valve position of the directional valve 17a. A force prevailing in the first control volume and a force prevailing in the second control volume are provided for setting the same valve position of the directional valve 17a. The first control volume and the second control volume are in each case delimited by a control surface which acts in the direction of the same valve position. The first control surface associated with the first control line connection 18a, i.e. the control surface delimiting the first control volume, and the second control surface associated with the second control line connection 19a, i.e. the control surface delimiting the second control volume, are oriented in the same direction.

By comparison with the first control line connection 18a and the second control line connection 19a the third control line connection 20a is provided in an opposite direction for actuation of the directional valve 17a. By comparison with the control line connections 18a, 19a the third control line connection 20a is provided for setting an opposite valve position of the directional valve 17a. By comparison with the force prevailing in the first control volume and the force prevailing in the second control volume a force prevailing in the third control volume is provided for setting an opposite valve position of the directional valve 17a. The force prevailing in the third control volume counteracts the force prevailing in the first control volume and the force prevailing in the second control volume. The third control volume is delimited by a third control surface which acts in an opposition valve position to the first control surface delimiting the first control volume and to the second control surface delimiting the second control volume. The third control surface associated with the third control line connection 20a, i.e. the control surface delimiting the third control volume, is oriented in the opposite direction to the first control surface associated with the first control line connection 18a and to the second control surface associated with the second control line connection 19a. The disc actuation pressure provided for closure of the combined coupling unit S2a, the claw actuation pressure provided for closure of the combined coupling unit S2a and the disc actuation pressure provided for closure of the coupling unit S6a act in each case as a control pressure in the directional valve 17a, wherein the disc actuation pressure provided for closure of the coupling unit S6a counteracts the disc actuation pressure provided for closure of the combined coupling unit S2a and the claw actuation pressure for closure of the combined coupling unit S2a.

The directional valve 17a also has a spring 24a which in actuation terms is opposed to the first control line connection 18a and the second control line connection 19a and is aligned with the third control line connection 20a. The spring 24a counteracts the force prevailing in the first control volume and the force prevailing in the second control volume. The spring 24a acts in the direction of the force prevailing in the third control volume. The spring 24a is provided so as to be pretensioned by the force prevailing in the first control volume. It is pretensioned by the disc actuation pressure provided for closure of the form-locking unit 13a. The spring 24a is provided so as to remain pretensioned by the force prevailing in the second control volume. The spring 24a has a spring force which with regard to a shifting direction is aligned with the third control surface. The spring force of the spring 24a is opposed to the first control surface and to the second control surface with regard to the shifting direction. The spring force of the spring 24a and the disc actuation pressure provided for closure of the coupling unit S6a counteract the disc actuation pressure provided for closure of the combined coupling unit S2a and the claw actuation pressure provided for closure of the combined coupling unit S2a. The spring 24a is configured as a spiral spring. The directional valve 17a is configures as a 4/2-way valve.

The directional valve 17a is configured as a shift slide. It has a valve slide on which the operating medium pressure in the control volumes of the directional valve 17a acts. The valve slide of the directional valve 17a has the control surfaces. The operating medium pressure prevailing in the pressure chamber 42a of the first actuator 15a and the operating medium pressure prevailing in the pressure chamber 48a of the second actuator 16a act in the same direction of movement on the valve slide of the directional valve 17a. The operating medium pressure prevailing in the pressure chamber 51a of the third actuator 21a and the spring force of the spring 24a act in the same direction of movement on the valve slide of the directional valve 17a. In this case the operating medium pressure prevailing in the pressure chamber 42a of the first actuator 15a and the operating medium pressure prevailing in the pressure chamber 48a of the second actuator 16a counteract the operating medium pressure prevailing in the pressure chamber 51a of the third actuator 21a and the spring force of the spring 24a. The disc actuation pressure provided for closure of the friction-locking unit 13a and the claw actuation pressure provided for closure of the form-locking unit 14a act on the valve slide for setting the valve position in which the first actuator 15a is connected in pressure terms to the first solenoid valve 53a. The disc actuation pressure provided for closure of the friction-locking unit 37a and the spring force of the spring 24a act on the valve slide for setting the valve position in which the first actuator 15a is separated in pressure terms from the first solenoid valve 53a. The spring force of the spring 24a and the disc actuation pressure provided for closure of the coupling unit S6a counteract the disc actuation pressure provided for closure of the combined coupling unit S2a and counteract the claw actuation pressure provided for closure of the combined coupling unit S2a on the valve slide of the directional valve 17a.

In order to set a defined time response and/or a defined response to the corresponding operating medium pressure, the transmission device has a plurality of filling nozzles 67a, 68a, 69a, 70a. The filling nozzle 67a is disposed in flow terms between the pressure chamber 42a of the actuator 15a and the directional valve 17a. The filling nozzle 67a is disposed in the working line 57a. The filling nozzle 68a is disposed in flow terms between the pressure chamber 52a of the actuator 26a and the directional valve 17a. The filling nozzle 68a is disposed in the working line 58a. The filling nozzle 69a is disposed in flow terms between the pressure chamber 51a of the actuator 26a and the directional valve 17a. The filling nozzle 70a is disposed in flow terms between the pressure chamber 48a of the actuator 16a and the directional valve 17a. The filling nozzles 67a, 68a, 69a, 70a are in each case configured as a filling orifice. In principle at least one of the filling nozzles 67a, 68a, 69a, 70a can be omitted.

The directional valve 17a has a first valve position, in which its second working line connection 29a is connected to its supply line connection 55a, and a second valve position, in which its first working line connection 28a is connected to its supply line connection 55a. In the first valve position of the directional valve 17a, its second working line connection 29a thereof is connected to its supply line connection 55a, and its first working line connection 28a is connected to its discharge connection 56a. In the second valve position of the directional valve 17a, its first working line connection 28a is connected to its supply line connection 55a, and its second working line connection 29a is connected to its discharge connection 56a. In the first valve position of the directional valve 17a the first solenoid valve 53a is connected in pressure terms to the actuator 26a provided for actuation of the coupling unit S1a. In the second valve position of the directional valve 17a the first solenoid valve 53a is connected in pressure terms to the actuator 15a provided for actuation of the form-locking unit 14a of the combined coupling unit S2a. In the forward gears V1, V2, V3, V4, V5, V6, V7 the directional valve 17a is shifted in its first valve position. In the forward gears V8, V9 as well as in the reverse gear R the directional valve 17a is shifted in its second valve position. The directional valve 17a shifts into its first valve position when the sum of a force acting on the valve slide, which results from the disc actuation pressure provided for closure of the coupling unit S6a, and the spring force of the spring 24a acting on the valve slide is greater than the sum of a force acting on the valve slide, which results from the disc actuation pressure provided for closure of the coupling unit S2a, and a force acting on the valve slide, which results from the claw actuation pressure provided for closure of the coupling unit S2a. The directional valve 17a shifts into its second valve position when the sum of the force acting on the valve slide, which results from the disc actuation pressure provided for closure of the coupling unit S6a, and the spring force of the spring 24a acting on the valve slide is less than the sum of a force acting on the valve slide, which results from the disc actuation pressure provided for closure of the coupling unit S2a. In FIG. 4 the directional valve 17a is illustrated in the first valve position.

The first valve position of the directional valve 17a is configured as a default position which is set autonomously in a pressureless state of the pressure chamber 42a, 48a, 51a. For this purpose the directional valve 17a has the spring 24a. The spring 24a sets the first valve position autonomously in the forward gears V1, V2, V3. In its first valve position the directional valve 17a connects the first solenoid valve 53a to the fourth actuator 26a, so that the pressure chamber 52a of the fourth actuator 26a can be supplied with the operating medium pressure set by the first solenoid valve 53a for closure of the coupling unit S1a. In its second valve position the directional valve 17a connects the first solenoid valve 53a to the first actuator 15a, so that the pressure chamber 42a of the first actuator 15a can be supplied with the operating medium pressure set by the first solenoid valve 53a for closure of the form-locking unit 14a of the combined coupling unit S2a.

The second valve position of the directional valve 17a is configured as a shift position which is set in a pressure-controlled manner. For shifting of the directional valve 17a into the second valve position, by means of the second solenoid valve the operating medium pressure in the pressure chamber 48a is increased until the force resulting from the operating medium pressure in the first control volume of the directional valve 17a exceeds the spring force of the spring 24a and the force resulting from the operating medium pressure in the third control volume. The directional valve 17a shifts into its second valve position when the force in the first control volume resulting from the disc actuation pressure provided for closure of the friction-locking unit 13a is greater than the sum of the spring force of the spring 24a and the force in the third control volume resulting from the disc actuation pressure provided for closure of the friction-locking unit 37a. In this way the directional valve 17a connects the first actuator 15a and the first solenoid valve 53a to one another in pressure terms, so that the form-locking unit 14a of the combined coupling unit S2a can be closed. If a tooth-on-tooth-position is produced between the form-locking elements 34a, 35a when the form-locking unit 14a is closed, a slip state is set between the friction-locking elements 32a, 33a of the friction-locking unit 13a by a reduction of the disc actuation pressure in the pressure chamber 48a, so that the tooth-on-tooth-position is released. The disc actuation pressure in the pressure chamber 48a is reduced only to such an extent that the sum of the force in the first control volume and the force in the second control volume is greater than the sum of the force in the third control volume and the spring force, so that the closed state of the form-locking unit 14a is maintained. In order to open the form-locking unit 14a again the pressure is first of all relieved by means of the solenoid valve 53a. Only then is the position of the directional valve changed over for freeing of the solenoid valve 53a and for connection to the shift element S1a. For this purpose the operating medium pressure in the pressure chamber 48a of the second actuator 16a is reduced and/or the operating medium pressure in the pressure chamber 51a of the third actuator 21a is increased until the sum of the spring force of the spring 24a and the force resulting from the operating medium pressure in the third control volume exceeds the sum of the force resulting from the operating medium pressure in the first control volume and the force resulting from the operating medium pressure in the second control volume. The switchover of the directional valve 17a can also take place only by an increase in the pressure in the pressure chamber 51a at constant pressure in the pressure chamber 48a. The directional valve 17a switches into its first valve position when the sum of the force in the third control volume and the spring force is greater than the sum of the force in the first control volume and the force in the second control volume. As a result the third coupling unit S1a can be closed again by means of the first solenoid valve 53a.

For closure of the form-locking unit 14a of the combined coupling unit S2a, the force on the valve slide resulting from the operating medium pressure in the pressure chamber 48a of the second actuator 16a must be greater than the sum of the spring force of the spring 24a and the force on the valve slide resulting from the operating medium pressure in the pressure chamber 51a of the third actuator 21a, so that the directional valve 17a switches into its second valve position. Furthermore the first solenoid valve 53 must provide an operating medium pressure by which the form-locking unit 14a is closed.

In the forward gears V1, V2, V3, V4, V5, V6, V7 the disc actuation pressure provided for closure of the combined coupling unit S2a is zero, so that the valve slide of the directional valve 17a is moved into the first valve position by the spring force of the spring 24a in the forward gears V1, V2, V3 and by the disc actuation pressure provided for closure of the coupling unit S6a in the forward gears V4, V5, V6, V7. In the forward gears V8, V9, the force acting on the valve slide, which results from the disc actuation pressure provided for the closure of the combined coupling unit S2a, is greater than the sum of the spring force of the spring 24a acting on the valve slide and the force acting on the valve slide, which results from the disc actuation pressure provided for the closure of the coupling unit S2a, so that the disc actuation pressure provided for closure of the combined coupling unit S2a moves the valve slide of the directional valve 17a into the second valve position. In the forward gears V8, V9 the disc actuation pressure provided for the closure of the combined coupling unit S2a must move the valve slide against the disc actuation pressure provided for closure of the coupling unit S6a and against the spring force of the spring 24a. In the reverse gear, the force acting on the valve slide, which results from the disc actuation pressure provided for closure of the combined coupling unit S2a, is greater than the spring force of the spring 24a acting on the valve slide, so that the disc actuation pressure provided for closure of the combined coupling unit S2a moves the valve slide of the directional valve 17a into the second valve position. In the reverse gear R, the disc actuation pressure provided for the closure of the combined coupling unit S2a must move the valve slide only against the spring force of the spring 24a, since the disc actuation pressure provided for closure of the coupling unit S6a is zero in the reverse gear R.

If the disc actuation pressure provided for the closure of the combined coupling unit S2a drops in the shifted forward gears V8, V9 as well as in the reverse gear R, in particular for release of a tooth-on-tooth position in the form-locking unit 14a of the combined coupling unit S2a, the sum of the claw actuation pressure provided for the closure of the combined coupling unit S2a and the disc actuation pressure lowered to a pressure level below a holding pressure for the discs of the friction-locking unit 13a holds the valve slide of the directional valve 17a in the second valve position, since the sum of these forces acting on the valve slide is greater than the sum of the spring force of the spring 24a acting in the opposite direction on the valve slide and the force which results from the disc actuation pressure provided for closure of the coupling unit S6a.

The exemplary embodiment of the invention illustrated in FIG. 4 advantageously enables a release of a tooth-on-tooth position of the form-locking unit 14a in the event of a low mechanical loading of the claw toothing. The mechanical loading of the claw toothing when a tooth-on-tooth position is released can be kept low by the exemplary embodiment shown in FIG. 4, since the claw actuation pressure only has to be greater than the sum of the forces resulting from the actuation pressure of the coupling unit S6a and the spring force of the spring 24a. Moreover, due to the provision of two control surfaces, namely the first control surface and the second control surface, which are in each case associated with the first control line connection 19a and the second control line connection 20a, in the exemplary embodiment of the invention which is shown in FIG. 4 it is possible, when a tooth-on-tooth position is released, to obtain a residual actuation pressure, such as for example the pressure level of the return spring of the parallel connected friction-locking unit 13a, on the directional valve 17a, this pressure together with the claw actuation pressure holding the valve position of the directional valve 17a when a tooth-on-tooth position is released. The claw actuation pressure when a tooth-on-tooth position is released can therefore be chosen to be lower.

The claw actuation pressure is advantageously less than a working pressure of the transmission device. In the reverse gear R the third actuator is advantageously not supplied with actuation pressure, so that in the reverse gear R no pressure is applied to the third control line connection 20a. The claw actuation pressure exerts an axial force on the claw toothing. The higher the axial force on the claw toothing is, the higher the wear of the claw toothing is in a release process of a tooth-on-tooth position of the claw toothing.

Furthermore, due to the comparatively low claw actuation pressure necessary for release of a tooth-on-tooth position, the diameter of the filling nozzle 67a can be comparatively large, so that in the exemplary embodiment of the invention shown in FIG. 4 the diameter of the filling nozzle 67a does not have a delaying effect in a disengagement operation of the form-locking unit 14a, so that advantageously a spontaneous disengagement of the form-locking unit 14a is possible.

Figure 5:
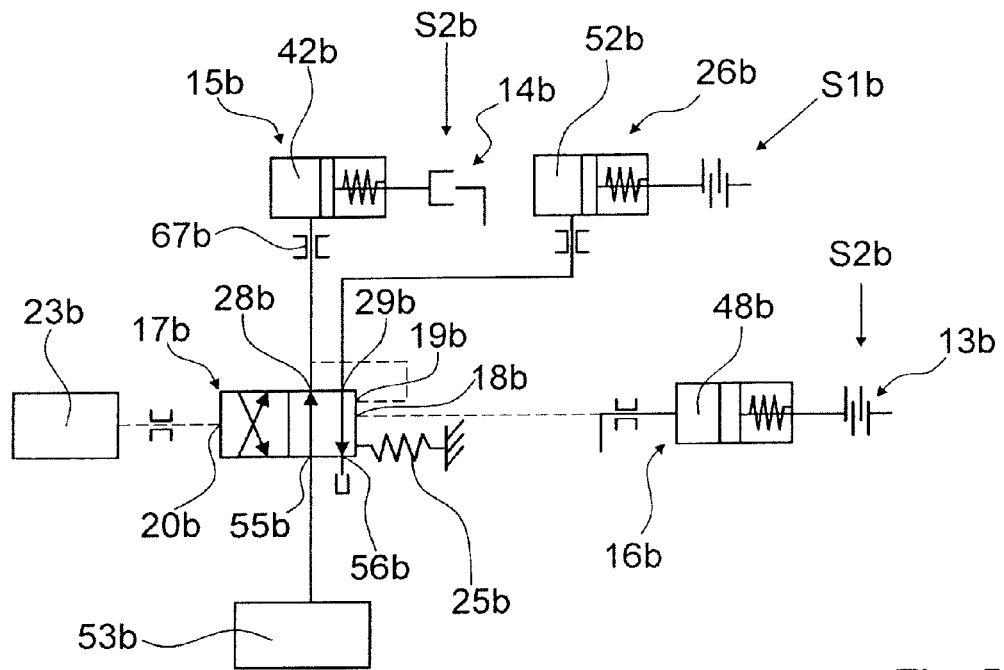
FIG. 5 illustrates an alternatively configured actuation of the actuators.
Figure 6:
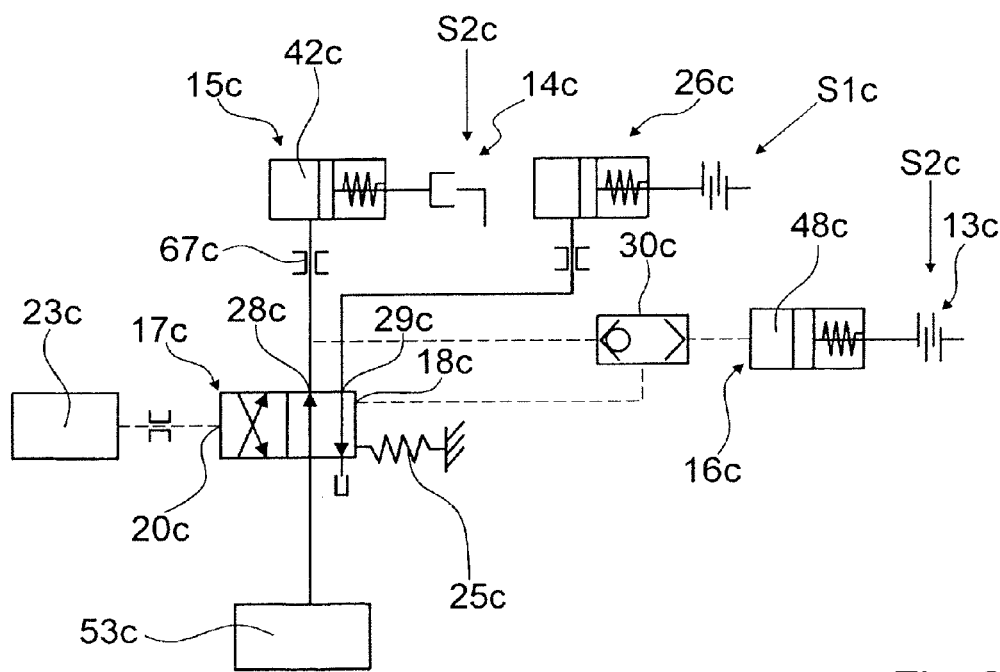
FIG. 6 illustrates a third exemplary embodiment of an actuation of the actuators.

FIGS. 5 and 6 further show two further exemplary embodiments of the invention. The following description is limited substantially to the differences between the exemplary embodiments, wherein, with regard to components with the same designations, in particular with regard to components with the same reference signs, reference may be made in principle to the drawing and/or drawings and/or the description of the other exemplary embodiments, in particular the exemplary embodiment shown in FIGS. 1 and 4. In order to distinguish the exemplary embodiments, the letter a in the reference signs of the exemplary embodiment in FIGS. 1 to 4 is replaced by the letter b in the reference signs of the exemplary embodiment in FIGS. 5 and 6.

FIG. 5 shows in part a transmission device for a motor vehicle in a second exemplary embodiment. The transmission device comprises a combined coupling unit S2b, which for non-rotatable connection of two coupling elements has a friction-locking unit 13b and a form-locking unit 14b connected in parallel to the friction-locking unit 13b, a first hydraulic actuator 15b for actuation of the form-locking unit 14b, a second hydraulic actuator 16b for actuation of the friction-locking unit 13b and a directional valve 17b which is provided for control of the first actuator 15b and has a first control line connection 18b, a second control line connection 19b and a third control line connection 20b. The first control line connection 18b is connected in pressure terms to the second actuator 16b and the second control line connection 19b is connected in pressure terms to the first actuator 15b. Furthermore the directional valve 17b has a first working line connection 28b, which is connected to the first actuator 15b of the combined coupling unit S2b, and a second working line connection 29b, which is connected to a fourth actuator 26b for actuation of a further coupling unit S1b. The directional valve 17b also has a spring 25b. For supply of operating medium to the first actuator 15b and the fourth actuator 26b the transmission device has a first solenoid valve 53b. The directional valve 17b controls the dual use of the first solenoid valve 53b. The transmission device also has a working pressure system 23b in which a working pressure prevails.

In contrast to the previous exemplary embodiment the third control line connection 20b is permanently connected in pressure terms to the working pressure system 23b. The working pressure is applied at least predominantly to the third control line connection 20b of the directional valve 17b. Thus the working pressure prevails in a third control volume of the directional valve 17b. The working pressure counteracts an operating medium pressure applied to the first control line connection 18b and an operating medium pressure applied to the second control line connection 19b. A disc actuation pressure provided for the closure of the combined coupling unit S2b, a claw actuation pressure provided for the closure of the combined coupling unit S2b and the working pressure act in each case as control pressure in the directional valve 17b, wherein the working pressure counteracts the disc actuation pressure provided for the closure of the combined coupling unit S2b and the claw actuation pressure provided for the closure of the combined coupling unit S2b. The working pressure acts on the valve slide of the directional valve 17b for setting the valve position in which the first actuator 15b is separated in pressure terms from the first solenoid valve 53b.

In further contrast to the previous exemplary embodiment, in actuation terms the spring 25b is opposed to the third control line connection 20b and the first control line connection 18b and is aligned with the second control line connection 19b. The spring 25b acts on the valve slide in the opposite direction to a force prevailing in a third control volume of the directional valve 17b. The spring 25b acts on the valve slide in the direction of a force prevailing in a first control volume of the directional valve 17b as well as in the direction of a force prevailing in a second control volume of the directional valve 17b. The spring 25b is provided so as to be pretensioned by the force prevailing in the third control volume. It is pretensioned by the working pressure. The spring 25b acts on the valve slide of the directional valve 17b for setting the valve position in which the first actuator 15b is connected in pressure terms to the first solenoid valve 53b. The spring 25b has a spring force which with regard to a shifting direction is opposed to the third control surface. The spring force of the spring 25b is aligned with a first control surface of the directional valve 17b and with a second control surface of the directional valve 17b with regard to the shifting direction. The spring force of the spring 25b, together with the disc actuation pressure provided for closure of the combined coupling unit S2a and the claw actuation pressure provided for closure of the combined coupling unit S2a, counteracts the working pressure.

Furthermore a claw actuation pressure set by the first solenoid valve 53b in a pressure chamber 42b of the first actuator 15b and the working pressure are at least substantially the same, in contrast to the previous exemplary embodiment. Moreover the disc actuation pressure set by a second solenoid valve in a pressure chamber 48b of the second actuator 16b and the working pressure are at least substantially the same, in contrast to the previous exemplary embodiment.

The directional valve 17b has a first valve position, in which its first working line connection 28b is connected to its supply line connection 55b, and a second valve position, in which its second working line connection 29b is connected to its supply line connection 55b. In the first valve position of the directional valve 17b, its first working line connection 28b is connected to its supply line connection 55b, and its second working line connection 29b is connected to its discharge connection 56b. In the second valve position of the directional valve 17b, its second working line connection 29b is connected to its supply line connection 55b, and its first working line connection 28b is connected to its discharge connection 56b. In the first valve position of the directional valve 17b the first solenoid valve 53b is connected in pressure terms to the first actuator 15b, so that the pressure chamber 42a of the first actuator 15b can be supplied with the claw actuation pressure set by the first solenoid valve 53b for closure of the form-locking unit 14b. In the second valve position of the directional valve 17b the first solenoid valve 53b is connected in pressure terms to the fourth actuator 26b, so that a pressure chamber 52b of the fourth actuator 26b can be supplied with a disc actuation pressure set by the first solenoid valve 53b for closure of the coupling unit S1b. In FIG. 5 the directional valve 17b is illustrated in the first valve position. The first valve position of the directional valve 17b is set autonomously when the working pressure system 23b is pressureless. For this purpose the directional valve 17b has the spring 25b. When a working pressure prevails and the pressure chambers 42b, 48b are pressureless, the directional valve 17b is shifted in its second valve position. Since the working pressure and the disc actuation pressure provided for closure of the friction-locking unit 13b in the pressure chamber 48b are at least substantially the same, the directional valve 17b shifts due to the spring 25b into its first valve position when the disc actuation pressure prevails in the pressure chamber 48b.

For shifting of the directional valve 17b from the second valve position into the first valve position, by means of the second solenoid valve the disc actuation pressure provided for the closure of the friction-locking unit 13b is set in the pressure chamber 48a of the second actuator 16b. The spring 25b sets the first valve position when the disc actuation pressure provided for the closure of the friction-locking unit 13b is set in the pressure chamber 48b. In order to open the form-locking unit 14a again, first of all the pressure drops by means of the solenoid valve 53b. Only after that is the position of the directional valve 17b changed, so that the shift element 27b can be controlled again by means of the solenoid valve 53b. The shift slide only changes its shift position when the force on the directional valve due to the disc actuation pressure in the pressure chamber 48b together with the spring force is less than the force on the directional valve due to the working pressure. This can be achieved in that the working pressure is controlled to be higher than the disc actuation pressure in the pressure chamber 48b.

In the forward gears V1, V2, V3, V4, V5, V6, V7, the disc actuation pressure provided for the closure of the combined coupling unit S2b is zero, wherein the working pressure moves the valve slide of the directional valve 17b into the second valve position since the force acting on the valve slide, which results from the working pressure, is greater than the spring force of the spring 24b. In the forward gears V1, V2, V3, V4, V5, V6, V7 the working pressure must move the valve slide only against the spring force of the spring 24b. In the forward gears V8, V9, as well as the reverse gear R, the force acting on the valve slide, which results from the disc actuation pressure provided for the closure of the combined coupling unit S2b, and the force acting on the valve slide which results from the working pressure are of the same magnitude, so that the spring force of the spring 24b moves the valve slide of the directional valve 17b into the first valve position.

In order to set a defined time response and/or a defined response to the corresponding operating medium pressure, the transmission device which is shown in FIG. 5 has at least the filling nozzle 67b. The filling nozzle 67b is disposed in flow terms between the pressure chamber 42b of the actuator 15b and the directional valve 17b.

FIG. 6 shows in part a transmission device for a motor vehicle in a third exemplary embodiment. The transmission device comprises a combined coupling unit S2c, which for non-rotatable connection of two coupling elements has a friction-locking unit 13c and a form-locking unit 14c connected in parallel to the friction-locking unit 13c, a first hydraulic actuator 15c for actuation of the form-locking unit 14c, a second hydraulic actuator 16c for actuation of the friction-locking unit 13c and a directional valve 17c which is provided for control of the first actuator 15c. Furthermore the directional valve 17c has a first working line connection 28c, which is connected to the first actuator 15c of the combined coupling unit S2c, and a second working line connection 29c, which is connected to a fourth actuator 26c for actuation of a further coupling unit S1c. The directional valve 17c also has a spring 25c. For supply of operating medium to the first actuator 15c and the fourth actuator 26c the transmission device has a first solenoid valve 53c. The directional valve 17c controls the dual use of the first solenoid valve 53c. The transmission device also has a working pressure system 23c. Furthermore a claw actuation pressure set by the first solenoid valve 53c in a pressure chamber 42c of the first actuator 15c and a disc actuation pressure set by a second solenoid valve in a pressure chamber 48c of the second actuator 16c correspond to a working pressure in the working pressure system 23c.

In contrast to the previous exemplary embodiment the directional valve 17b only has two control line connections 18c, 20c and thus only two control volumes. The first control line connection 18c can be connected in pressure terms to the first actuator 15c and the second actuator 16c. The transmission device has a switch-over valve for pressure-dependent connection of the first control line connection 18c to the first actuator 15c or the second actuator 16c. The switch-over valve 30c connects the first control line connection 18c to the first actuator 15c when a claw actuation pressure in the pressure chamber 42c of the first actuator 15c is greater than a disc actuation pressure in the pressure chamber 48c of the second actuator 16c. The switch-over valve 30c connects the first control line connection 18c to the second actuator 16c when the disc actuation pressure in the pressure chamber 48c is greater than the disc actuation pressure in the pressure chamber 48c. The switch-over valve 30c is configured as a ball switch-over valve.

The other control line connection 20c is permanently connected in pressure terms to the working pressure system 23c. The working pressure and an operating medium pressure on the first control line connection 18c act against one another on a valve slide of the directional valve 17c. A control surface of the valve slide associated with the first control line connection 18c and a control surface of the valve slide associated with the other control line connection 20c are oriented in opposite directions relative to one another. A spring force of the spring 25c is opposed to the third control line connection 20c and is aligned with the first control line connection 18c. The spring 25c acts on the valve slide in the opposite direction to a force prevailing in a third control volume of the directional valve 17c.

In order to set a defined time response and/or a defined response to the corresponding operating medium pressure, the transmission device which is shown in FIG. 6 has at least the filling nozzle 67c. The filling nozzle 67c is disposed in flow terms between the pressure chamber 42c of the actuator 15c and the directional valve 17c.

LIST OF REFERENCE SIGNS 13 friction-locking unit
14 form-locking unit
15 actuator
16 actuator
17 directional valve
18 control line connection
19 control line connection
20 control line connection
21 actuator
23 working pressure system
24 spring
25 spring
26 actuator
28 working line connection
29 working line connection
30 switch-over valve
31 transmission housing
32 friction-locking element
33 friction-locking element
34 form-locking element
35 form-locking element
36 direction of actuation
37 friction-locking unit
38 friction-locking unit
39 actuating cylinder
40 piston element
41 actuating element
42 pressure chamber
44 spring
45 actuating cylinder
46 piston element
47 actuating element
48 pressure chamber
50 spring
51 pressure chamber
52 pressure chamber
53 solenoid valve
54 operating medium output
55 supply line connection
56 discharge connection
57 working line
58 working line
59 supply line
60 control line
61 control line
62 control line
63 gear wheel set
64 transmission input shaft
65 transmission output shaft
66 main axis of rotation
67 filling nozzle
68 filling nozzle
69 filling nozzle
70 filling nozzle
P1 planetary gear stage
P11 sun gear
P12 planetary gear support
P13 ring gear
P14 planetary gear
P2 planetary gear stage
P21 sun gear
P22 planetary gear support
P23 ring gear
P24 planetary gear
P3 planetary gear stage
P31 sun gear
P32 planetary gear support
P33 ring gear
P34 planetary gear
P4 planetary gear stage
P41 sun gear
P42 planetary gear support P43 ring gear
P44 planetary gear
S1 coupling unit
S11 coupling element
S12 coupling element
S2 coupling unit
S21 coupling element
S22 coupling element
S3 coupling unit
S31 coupling element
S32 coupling element
S4 coupling unit
S41 coupling element
S42 coupling element
S5 coupling unit
S51 coupling element
S52 coupling element
S6 coupling unit
S61 coupling element
S62 coupling element
V1 forward gear
V2 forward gear
V3 forward gear
V4 forward gear
V5 forward gear
V6 forward gear
V7 forward gear
V8 forward gear
V9 forward gear
R reverse gear

The invention claimed is:

1. A transmission device for a motor vehicle, comprising:
a coupling unit, which for non-rotatable connection of two coupling elements has a friction-locking unit and a form-locking unit connected in parallel to the friction-locking unit wherein the friction-locking unit and the form-locking unit are associated with a common rotatable coupling element of the two coupling elements;
a first hydraulic and/or pneumatic actuator, wherein the form-locking unit is actuatable by the first hydraulic and/or pneumatic actuator;
a second hydraulic and/or pneumatic actuator, wherein the friction-locking unit is actuatable by the second hydraulic and/or pneumatic actuator; and
a directional valve;
wherein the directional valve has a first control line connection which in at least one operational state is connected in pressure terms to the second hydraulic and/or pneumatic actuator;
wherein the directional valve has a second control line connection which in at least one operational state is connected in pressure terms to the first hydraulic and/or pneumatic actuator;
and wherein the first and second control line connections control a movement of a valve slide of the directional valve.

2. The transmission device according to claim 1, wherein the valve slide has two control surfaces which are associated respectively with one of the first and second control line connections and which are oriented in a same direction.

3. The transmission device according to claim 1, wherein the directional valve has a third control line connection, wherein the valve slide has a third control surface which is associated with the third control line connection, and wherein the third control surface is oriented in an opposite direction to the two control surfaces.

4. The transmission device according to claim 1, further comprising a solenoid valve and a third actuator for actuation of a second coupling unit which in at least one operational state is connected in pressure terms to the third control line connection.

5. The transmission device according to claim 1, wherein the directional valve has a spring wherein a spring force of the spring is oriented in a same direction as the third control surface which is associated with the third control line connection.

6. The transmission device according to claim 1, wherein the second coupling unit is closed in a fourth, a fifth, a sixth, a seventh, an eighth, and a ninth forward gear and wherein the coupling unit is closed in the eighth forward gear, the ninth forward gear, and a reverse gear.

7. The transmission device according to claim 3, further comprising a working pressure system which, in at least one state, is connected in pressure terms to the third control line connection.

8. The transmission device according to claim 7, wherein the directional valve has a spring wherein a spring force of the spring is oriented in an opposite direction as the third control surface which is associated with the third control line connection.

9. The transmission device according to claim 1, further comprising a third actuator for actuation of a second coupling unit.

* * * * *